Fig. 1

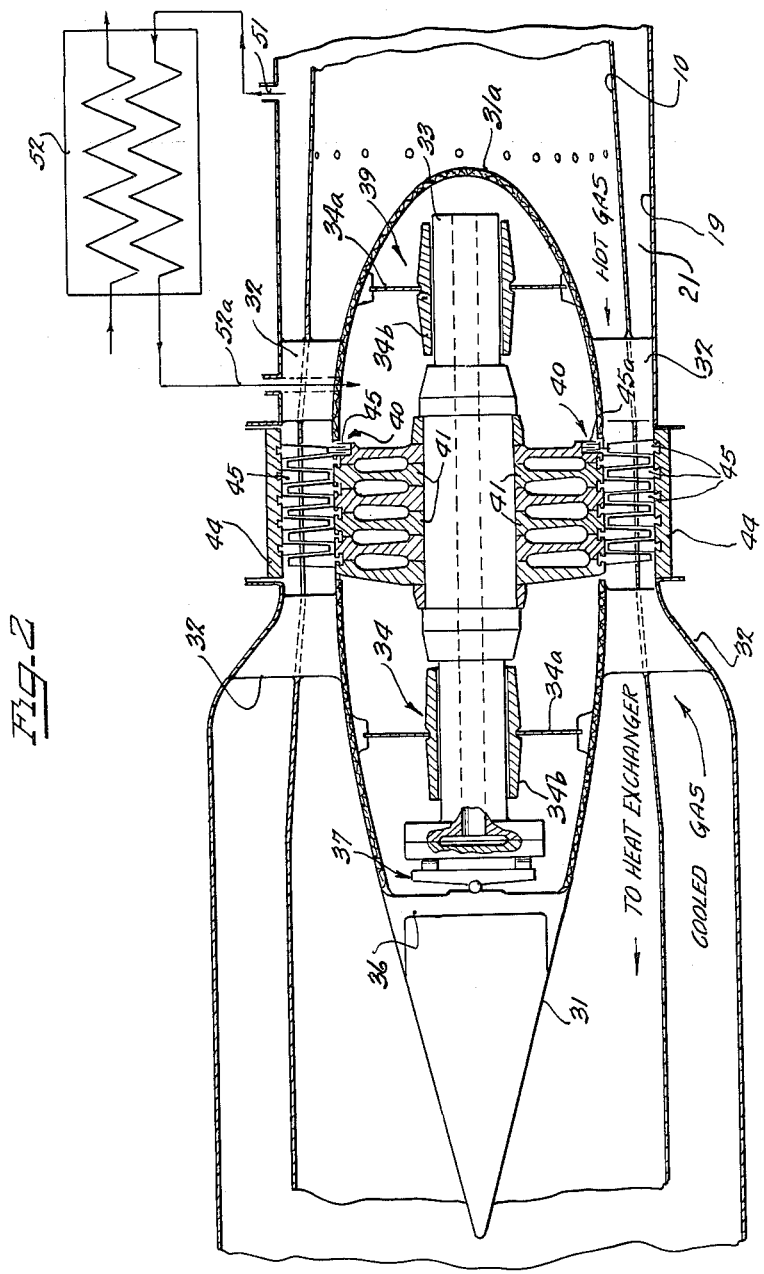

Oct. 5, 1965                P. FORTESCUE                3,210,254
                HEAT EXTRACTION SYSTEM FOR A NUCLEAR REACTOR
Filed Feb. 10, 1961                                3 Sheets-Sheet 3
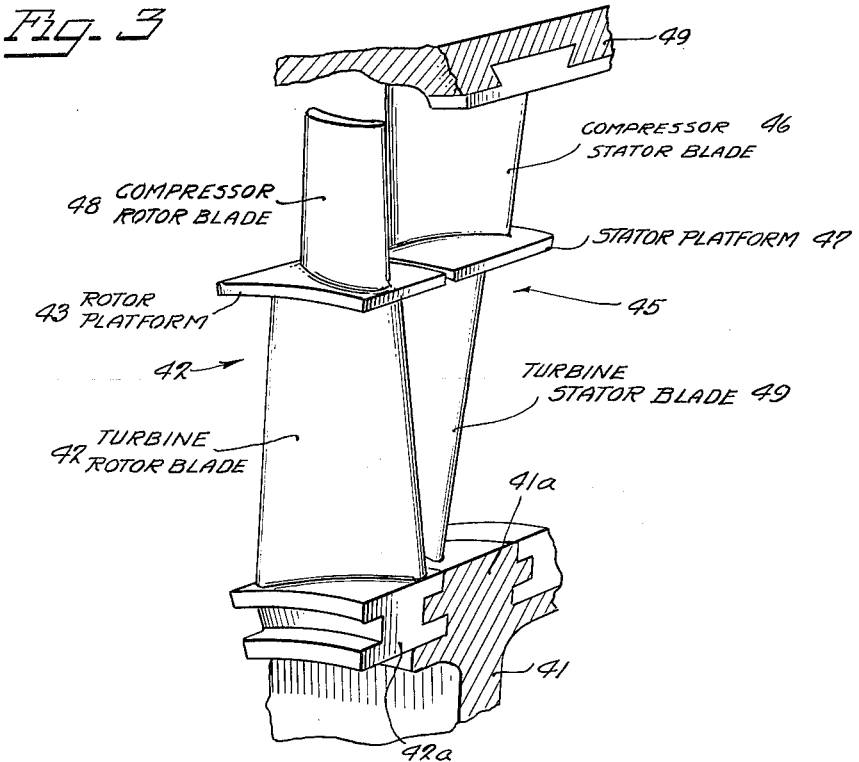
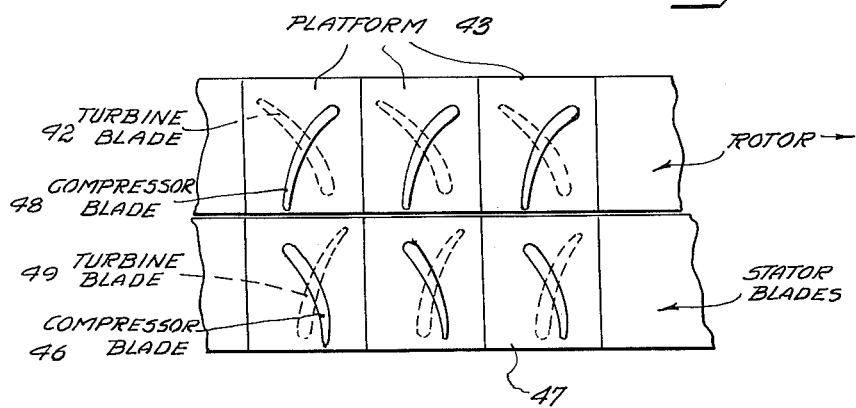
Inventor
Peter Fortescue
By Soans, Anderson, Luedeka & Fitch
Attys United States Patent Office 3,210,254
Patented Oct. 5, 1965

3,210,254
HEAT EXTRACTION SYSTEM FOR A
NUCLEAR REACTOR
Peter Fortescue, Rancho Sante Fe, Calif., assignor to
General Dynamics Corporation, New York, N.Y., a
corporation of Delaware
Filed Feb. 10, 1961, Ser. No. 88,534
6 Claims. (Cl. 176—60)

This invention relates to a heat extraction system and, more particularly, to a heat extraction system which utilizes a free-running concentric turbine-compressor unit.

Various attempts have been made to develop a heat extraction system for use in conjunction with nuclear reactors or other heat sources whereby power can be efficiently derived from heat generated therein. One such system, of which applicant was a co-invention, is disclosed in British Patent 799,212 which issued August 6, 1958. This patent, while disclosing certain basic principles applicable to heat extraction systems in general, does not contemplate a system wherein a free-running, concentrically arranged turbine-compressor unit can be efficiently utilized. Moreover, neither applicant's previously conceived system nor other similar heat extraction systems have utilized nor suggested combining an ancillary starting circulator with a concentric turbine-compressor unit. The present invention contemplates a heat extraction system which combines such an ancillary starting circulator with a concentric turbine-compressor unit that does not require the utilization of an external shaft or power connection, thus eliminating various seal problems.

Accordingly, it is a prime object of the present invention to provide a new and improved free-running turbo-circulator for use in a heat extraction system.

A more specific object of the invention is to provide a concentric turbine-compressor unit having integrally connected turbine and compressor blades which effect the circulation of gas coolant through a closed system including a nuclear reactor and a heat exchanger wherefrom power is derived from heat generated in the core of a reactor.

Still another object of the invention resides in the provision of a heat extraction system utilizing a simple yet efficient free-running turbo-circulator which eliminates the need for external drive means.

Other objects and advantages of the present invention will become apparent from the following detailed description thereof when considered in conjunction with the accompanying drawings wherein:

FIGURE 1 is a schematic representation of a heat extraction system wherein a free-running concentric turbo-circulator is utilized;

FIGURE 2 is a sectional view more specifically illustrating the free-running turbo-circulator portion of the heat extraction system depicted in FIGURE 1;

FIGURE 3 is an enlarged fragmentary perspective of the integral arrangement of the turbine and compressor blades forming one portion of one stage of the free-running turbine-compressor unit; and FIGURE 4 is a fragmentary diagrammatic representation at platform elevation of the integral turbine and compressor rotor and stator blades.

Figure 1:
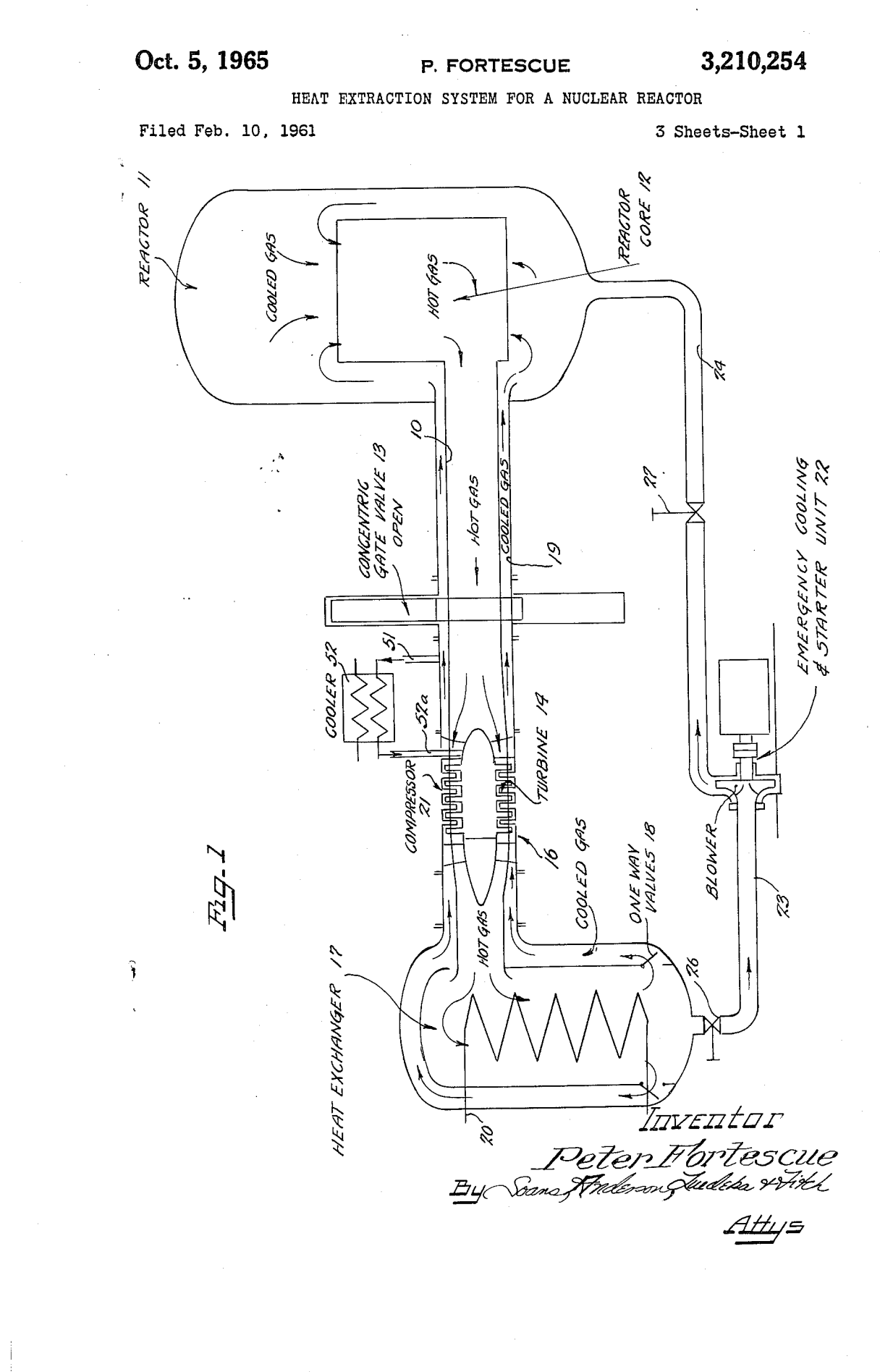

As illustrated in FIGURE 1, a heat extraction system is provided wherein a gas coolant, which is heated during the passage thereof through the core of an operating reactor, is passed through a turbine and, subsequently, through a heat exchanger wherein substantially all of the available reactor heat production is dissipated to produce power. Thereafter, the coolant is passed through a compressor and is compressed to a sufficient pressure to provide the necessary coolant circulation rate for the reactor. The compressor is mounted in concentric relation about the turbine unit and is simultaneously driven thereby. The concentrically arranged driving turbine and driven compressor units are provided with an integral arrangement of rotor and stator blades which require no external shaft drive. A single shaft, which is mounted for rotation on gas bearings, constitutes the sole rotating member of the turbo-circulator, and since no external drive means is required, it may be referred to as a "free-running" turbo-circulator.

Referring to the drawings, the heat extraction system includes a hot gas carrying conduit member or duct 10 which passes a heated gas coolant from a reactor 11 and, more particularly, from the core 12 of the reactor, through a gate valve 13 to a turbine 14. The turbine 14 constitutes one portion of a concentric "free-running" turbine-compressor unit 16, which shall be hereinafter referred to as a turbo-circulator. The hot gas passing through the turbine and striking the stator blades thereof results in the gas being directed toward the rotor blades so that the rotation thereof is effected and maintained.

Subsequent to the passage of the hot gas through the turbine 14, the gas is directed through a heat exchanger 17 and through a pair of one-way valves 18 to another coolant carrying conduit member or duct 19. A secondary section 20 of the heat exchanger may provide heat for power production by any suitable means.

The conduit member or duct 19 is mounted in concentric relation about the duct 10 and directs the passage of the gas emanating from the heat exchanger through a compressor unit 21, which forms the second half of the turbo-circulator 16. The rotor and stator blades (FIG. 3) of the concentric turbine and compressor unit are formed so that the flow of the hot gas which effects the actuation and maintains the operation of the turbine concomitantly results in the compressor unit being rendered effective to compress the circulating gas to a sufficient pressure so as to yield the necessary coolant circulation rate for the reactor. Subsequent to the compression thereof the cooled gas is directed through the duct 19 and back through the core of the reactor to effect the cooling thereof.

The initiation of the cycle generally described above is effected by an ancillary starting and emergency cooling unit 22 which is connected between the reactor and heat exchanger by a pair of conduit members or ducts 23 and 24. This unit, which is mounted in "parallel" relation with the main turbo-circulator unit 16, may be selectively introduced into the heat extraction system by the operation of a pair of valves 26 and 27 during start up of the turbo-circulator or when the turbo-circulator is otherwise not operating in a free-running state.

Referring to FIGURE 2, the concentric construction of the ducts 10 and 19 and of the turbo-circulator unit 16 and the other structural characteristics of the system, will be more fully described. The hot gas carrying duct or conduit member 10 encompasses an egg or teardrop-shaped shell or housing 31 which is supported on hollow struts or spiders 32. The struts 32 are in turn secured to and extend from the wall of the cooled gas carrying duct 19. Mounted within the shell 31, which is provided with a thermally insulated coating 31a, such as aluminum foil, on the inner surface thereof, is a hollow shaft 33 which may be supported either hydrostatically or hydrodynamically near the oppositely disposed extremities thereof on a plurality of gas bearings 34. The illustrated embodiment discloses hydrodynamic bearings including support members 34a and bearing surfaces 34b which generate shaft support pressure by viscous action. However, it is manifest that hydrostatic gas bearings, which could be supplied with the necessary gas pressure from an external source, might also be utilized.

A member 36 that is mounted within the outer shell 31 near a rear converging end portion thereof supports a double-acting thrust gas bearing 37 which serves to preclude axial movement of the shaft 33 and any possible accidental reverse thrust thereof. Further axial stabilization of the shaft 33 is provided by a thrust balancing means which incorporates a labyrinth seal of usual design and is generally designated by the numeral 40. The balancing means 40 is formed at the edge portion of one of a plurality of rotor blade support discs 41 which are suitably secured to the shaft for rotary motion therewith. The balancing means includes a plurality of spaced-apart projecting members which are formed on a cut-away section of the forwardmost disc 41. These disc-like members cooperate with a plurality of complementing disc-like members 45a that project downwardly from and are attached to one of a plurality of stator blade units 45 to form the labyrinth seal at the inlet portion of the turbine unit. The entire structural configuration, which is schematically illustrated in FIG. 2, i.e. the diameter of the labyrinth seal, is chosen to minimize the load on the thrust bearing 37 by compensating for the difference in the net thrust force imparted to the turbine and compressor rotor blade units by the circulating medium.

As illustrated in FIG. 3, the rotor blade support discs 41 have a diameter equal to the diameter of the outer surface of the shell 31 with which the outer peripheral edge of each disc is aligned. A plurality of integral rotor blade units 42 are attached to each disc 41 and more specifically to a slotted and tongued section 41a which is provided at the outer peripheral surface thereof. Each rotor blade unit 42, a plurality of which are provided for each stage of the turbo-circulator, extends substantially radially from the disc to which it is secured. More particularly, each blade unit 42 has a slotted base portion 42a which complements and is fixedly secured to the section 41a of the disc 41.

A plurality of spaced turbine rotor blades 42 extend outwardly from the base portion 42a, which in conjunction with the slotted section of the support segments constitute a portion of the wall section of the shell 31. A platform 43 is secured at the upper extremity of each of the rotor blades and is proportioned so as to serve as a segment of the wall of the hot gas carrying duct or pipe 10.

Similarly, extending downwardly from a support structure 44, which forms a portion of the outer surface of the duct 19, are a plurality of stator blade units 45. Each stator blade unit includes a compressor stator blade 46 and a stator platform 47, which is mounted adjacent the adjoining rotor platform or platforms 43. The adjacent platforms 43 and 47 are proportioned so as to minimize leakage of the gaseous medium between the concentric compressor and turbine stages. Extending from each of the platforms 43 and 47 are the compressor rotor blades 48 and turbine stator blades 49 respectively. As illustrated in FIGS. 2 and 3, these members are spaced a sufficient distance from the blade support members 41 and the support structure 44 so as to insure free and unrestricted high speed rotation of the rotor blades and platforms relative to the stator blades and platforms during operation of the turbo-circulator. However, this clearance is chosen so that a minimum amount of tip loss results.

As further illustrated in FIGS. 3 and 4 the turbo-circulator 16 has the adjacent rotor and stator platforms thereof mounted substantially in sliding engagement. Accordingly, upon rotation of the rotor blade units 42 on the shaft 33, the heated and cooled gases are generally confined within the respective turbine and compressor units.

The capabilities of the heat extraction system utilizing the concentric turbo-circulator in combination with an ancillary starting and cooling unit will best be understood from a detailed consideration of the overall operation of the system. When it is desired to place the gas cooled reactor 11 in operation the circulation of a gas coolant through the core 12 of the reactor must be effected. Accordingly, the selectively operable valves 26 and 27 (FIG. 1) are opened, and the starting or emergency cooling unit 22 is thereafter rendered effective. A blower 22a associated with the starting unit 22 supplies the necessary coolant to the core of the reactor, which is now rendered operable, through the conduit member 24.

Upon leaving the core of the reactor, the heated gas is passed through the duct 10, and through the gate valve 13, which is concentrically constructed so as to control the passage of gaseous mediums through one or both of the ducts 10 and 19. In addition, the gate valve 13, when closed, functions to separate the turbo-circulator from the reactor. Accordingly, when the valve 13 is closed, access may be had to the turbo-circulator without the hazards that might result if fission gases were allowed to pass freely through the concentric ducting system from the reactor toward the turbo-circulator.

The hot gas passes the valve 13 and enters the turbine unit 14 of the turbo-circulator 16, resulting in rotary motion being imparted to the rotor blade units 42 and the hollow shaft 33 whereto the blade units are secured through the support discs 41. Free and unrestricted rotation of the hollow shaft 33 and accordingly of the rotor blades 40 of the turbine is insured by the gas bearings 34 which substantially reduced rotational energy losses due to friction and the like.

The hot gas leaving the turbine unit 14 is thereafter circulated through the heat exchanger 17 and is passed through the valve 26 and the conduit member 23 so that the blower 22a initially maintains the forced and continuous circulation of a coolant through the core of the reactor. When the turbo-circulator reaches a sufficiently high rotational speed it becomes self-sustaining and no longer requires any external circulating means. The starter unit may then be shut down and the valves 26 and 27 closed.

While the foregoing description has related to an ancillary circulator which also acts as an emergency shutdown cooling unit, numerous other electrical and/or mechanical starting devices could be utilized in conjunction with the turbo-circulator. However, the separate starting unit 22 affords the advantage of eliminating unnecessary moving parts in the turbo-circulator other than the disc, blade and shaft assembly.

The hot gas emanating from the turbine, which is driven thereby, is passed through the heat exchanger, and is subsequently directed through the one-way valves 18 to the duct 19. Thereafter, the coolant is circulated through the compressor 16 which, due to the concentric structure of the turbo-circulator 16, is driven by the turbine 14. The passage of the gas through the compressor unit 16 results in the compression thereof to a sufficiently high pressure so as to provide the necessary coolant circulation rate for the system.

As illustrated in FIG. 1, a portion of the high pressure coolant emanating from the compressor is selectively tapped from the duct 19 through a conduit member 51 and is circulated through a schematically represented cooler 52. This cooled gaseous medium is subsequently passed into the shell 31 through a conduit member 52a and the hollow spiders or struts 32 and is supplied to the spaces about the bearings and rotor blade unit support discs 41.

The coolant escapes from the shell or housing 31 through the spaces adjacent the periphery of the support discs 41 and returns to the hot gas passing through the turbine. Additional internal cooling of the insulated housing or shell 31 can be effected by selectively supplying water thereto but, in general, this expedient is not required.

Referring more specifically to the operation of the concentric turbo-circulator illustrated in FIG. 2, the hot gas striking the forward part of the shell or housing 31, is directed past the struts or hollow spiders 32 and is directed into engagement with the stator blades 49 which extend downwardly from the support structure 44. Consequently, the gas, which in a preferred embodiment of the invention is helium, is directed against the turbine rotor blades of the first stage and of subsequent stages to effect the simultaneous rotation thereof as a single unit on the shaft 33. The previously described hollow construction of the shaft 33 insures that the pressure against each of the support discs 41 is substantially equalized, thereby reducing the turbine thrust load. Due to the integral construction of the turbine and compressor rotor blades which are joined by the rotor platforms 43, the compressor rotor blades are simultaneously rotated to effect the compression of the cooled gas subsequent to the circulation thereof through the heat exchanger 17.

The cooled gas leaving the compressor unit 21 enters the diffusor system or stage 21a which is defined by the walls of the concentric ducts 10 and 19. As illustrated in FIG. 2, the wall of the duct 10, which defines a portion of the diffusor section, is preferably drilled with a number of small bleeder holes which, due to the existing pressure differential between the two ducts, function to bleed off the layer of deenergized cooled gas which tends to develop along the wall at the compressor delivery. These bleeder holes, several rows of which might be drilled between the compressor delivery and the gate valve 13, substantially eliminate flow break-away which tends to develop at this location.

In a specific embodiment of the invention, the heat extraction system when used in conjunction with an operating reactor 11 will experience a rate of flow of circulating coolant through the turbine 14 which results in the five stages thereof being rotated at approximately 6300 r.p.m. on the hollow shaft 33. This rotational speed is well within the capabilities of the turbo-circulator which is constructed of materials chosen in accordance with the calculated aerodynamic loadings that will be imparted to the various members which form the single rotating unit. For example, the rotor and stator blades are preferably constructed of a high temperature, high creep strength steel alloy. It should be understood that the use of an inert gas such as helium as the circulating coolant further results in the elimination of oxidation and other chemical reaction problems which tend to be created at high temperatures.

The heated coolant emanating from the operating reactor 12, will have a temperature of approximately 800° C., and will impart a maximum blade stress of approximately six tons per square inch at the blade roots of the integral blade structure. This blade stress is calculated from the maximum axial velocity of the helium coolant which will be approximately 800 feet per second as the coolant passes through the compressor 21 and enters the diffusor system 21a.

Approximately 140 integral blade members will be used in both the compressor and turbine units. The blade height will be approximately 1½ inches in the compressor and 3¼ inches in the turbine. The entire turbo-circulator unit will be approximately 3 feet in diameter and will have a length of approximately 12 feet as measured from the end of the shell or housing 31 to the end of the diffusor section or system 21a.

It is estimated that a complete heat extraction system for use with a 150 mw. (electrical) reactor will include four such turbo-circulator units so that efficient cooling and heat extraction operations may be accomplished. Each of these several units would be arranged in parallel and the heated gas emanating from the reactor core would be uniformly distributed to each of the several units.

The pressure of the coolant leaving a reactor of this size is approximately 290 p.s.i. and the temperature thereof is approximately 800° C. This coolant upon passing through the turbine experiences a pressure and temperature drop of approximately 29 p.s.i. and 37° C., respectively. Subsequent to the circulation of the hot gas through the heat exchanger, the pressure and temperature thereof prior to entering the compressor which is driven by the turbine are approximately 257 p.s.i. and 312° C. During the compression of the coolant to achieve the desired circulation rate, the pressure thereof is raised approximately 37 p.s.i. and the temperature of the coolant is raised 37° C. so that the pressure and temperature of the coolant when entering the reactor are 294 p.s.i. and approximately 350° C.

From the foregoing it is apparent that an improved and efficient self-sustaining heat extraction system has been provided which may be effectively used in conjunction with numerous gas-cooled nuclear reactors. However, it is apparent that the free-running turbo-circulator may also be utilized in any number of similar applications wherein concentric ducting systems or the like are utilized and wherethrough it is desired to circulate a fluidized medium without the necessity of using externally powered apparatus.

The above description of the heat extraction system and the principles embodied therein are simply illustrative of invention. Numerous modifications of the structural features could readily be devised by those skilled in the art without departing from the invention. All such departures or modifications of the principles and structure disclosed herein would clearly fall within the spirit and scope of the invention as embodied in the following claims.

I claim:

1. A heat extraction system for a gas cooled, operating nuclear reactor which comprises a heat exchange means, a concentric ducting arrangement connected between said heat exchange means and the reactor, a conduit member extending between said heat exchange means and the operating reactor in fluid communication therebetween and in parallel relation to the outer duct of said concentric ducting arrangement, a gas flow circulating means connected in said conduit member for supplying a flow of gas to said reactor, the gas supplied to the operating reactor being heated thereby and passed through the inner duct of said concentric ducting arrangement to said heat exchange means, a gas turbine unit mounted within the inner duct of said concentric ducting system so as to be driven by the gas coolant being circulated from the reactor to said heat exchange means, a compressor unit mounted within the outer duct of said ducting system in concentric relation to said turbine unit, said turbine unit and said compressor unit having an integral arrangement of turbine-compressor stator and rotor blades so that said driven turbine effects the simultaneous driving of said compressor unit, the cooled gas circulating through the outer duct being compressed by said compressor unit, and selectively operable means mounted in said conduit member for isolating said gas flow circulating means from said system when said compressor provides the necessary circulation rate to sustain the system in a free running state.

2. A self-sustaining heat extraction system for an operating nuclear reactor; which system comprises a heat exchange means; a gas carrying ducting system having an inner duct and an outer duct formed in concentric relation and connected between said heat exchange means and the operating reactor; heated gas from the operating reactor passing through the inner duct and cooled gas from the heat exchange means passing through the outer duct; support means; gas bearing means for rotatably mounting said support means within the inner duct of said concentric ducting arrangement; a plurality of rotor blade units fixedly secured to said support means and extending outwardly therefrom; each of said rotor blade units including a turbine rotor blade connected to said support means and positioned in the path of the heated gas passing through said inner duct, a rotor blade platform connected to the outer extremity of said turbine rotor blade and mounted in alignment with the wall of said inner duct, and a compressor rotor blade secured to said rotor blade platform and mounted in the path of the cooled gas passing through said outer duct; and a compressor unit mounted within said outer duct in concentric relation with said support means and said rotor blade units; said compressor unit including a support housing surrounding said outer duct; a plurality of stator blade units stationarily secured to and extending inwardly from said support housing; each of said stator blade units including a compressor stator blade section secured to said support housing and positioned in the path of the cooled gas passing through said outer duct, a stator blade platform secured to the extremity of said compressor blade and mounted in alignment with the rotor blade platforms, and a turbine stator blade section secured to said compressor blade platform and disposed within said inner duct; said turbine-compressor rotor and stator blades being alternately disposed along the longitudinal axis of said ducting system so that the heated gas passing through said inner duct effects the simultaneous rotation of said turbine-compressor rotor blades relative to said stator blades; the cooled gas circulating through said outer duct being compressed to provide the necessary circulation rate to sustain the system in a free running state.

3. A heat extraction system for an operating gas cooled nuclear reactor which comprises a heat exchange means, a concentric duct system having gas carrying inner and outer ducts connected between said heat exchange means and the operating reactor, heated gas at a first pressure passing through said inner duct from the reactor to said heat exchange means, cooled gas at a second and higher pressure passing through said outer duct from said heat exchange means to the reactor, a gas turbine mounted within said inner duct so as to be driven by heated gas passing through said duct from the operating reactor to said heat exchange means, a compressor mounted within the outer duct of said concentric ducting system in concentric relation with said turbine, means operatively connecting said turbine to said compressor so that said driven turbine effects the simultaneous driving of said compressor, the cooled gas emanating from said heat exchange means being thereby compressed to sustain the system in a free-running state, and means formed in said inner duct for removing a portion of the cooled gas flowing within said outer duct from adjacent the wall of the inner duct at the outlet of said compressor so as to maintain a generally uniform flow of cooled gas across the width of said outer duct.

4. A heat extraction system for an operating gas cooled nuclear reactor which comprises a heat exchange means, a concentric duct system including a gas carrying outer duct having a diffusor section and an inner duct connected between said heat exchange means and the operating reactor, heated gas at a first pressure passing through said inner duct from the reactor to said heat exchange means, cooled gas at a second and higher pressure passing through said outer duct from said heat exchange means to the reactor, a gas turbine mounted within said inner duct so as to be driven by heated gas passing through said duct from the operating reactor to said heat exchange means, a compressor mounted within the outer duct of said concentric ducting system in concentric relation with said turbine, and means operatively connecting said turbine to said compressor so that said driven turbine effects the simultaneous driving of said compressor, the cooled gas emanating from said heat exchange means being thereby compressed to sustain the sysem in a free-running state, said inner duct having a plurality of bleeder holes drilled therein at the outlet of said compressor so that a portion of the cooled gas flowing through the diffusor section of said outer duct is removed from adjacent the wall of said inner duct due to the pressure differential between the gases in said inner and outer ducts and a generally uniform flow of cooled gas is maintained across the width of the diffusor section.

5. A heat extraction system which comprises heat exchange means, a concentric ducting system having gas-carrying inner and outer ducts connected between said heat exchange means and a heat source, a gas turbine mounted within said inner duct so as to be driven by heated gas passing through said inner duct from the heat source to said heat exchange means, a compressor mounted within the outer duct of said concentric ducting system in concentric relation with said turbine, means operatively connecting said turbine to said compressor so that said driven turbine effects the simultaneous driving of said compressor, the cooled gas emanating from said heat exchange means being thereby compressed to sustain the system in a free-running state, and conduit means in fluid communication between said heat exchange means and said heat source in parallel relation to said outer duct, and ancillary starting means connected to said conduit means for creating a flow of gas through said conduit means from said heat exchange means to said heat source whereby circulation of gas throughout the system can be initiated without mechanical starting of said compressor.

6. A heat extraction system for an operating gas-cooled nuclear reactor, which system comprises heat exchange means; a gas-carrying ducting system having an inner duct and an outer duct formed in concentric relation and connected between said heat exchange means and the reactor; heated gas from the reactor passing through said inner duct and cooled gas from the heat exchange means passing through said outer duct; a support structure rotatably mounted within said inner duct; a plurality of turbine rotor blades fixedly secured to said support structure and extending radially outwardly therefrom; a rotor blade platform portion connected to the outer extremity of each of said turbine rotor blades and mounted in alignment with the wall of said inner duct so as to constitute an extension of said inner duct; a plurality of compressor rotor blades extending radially outward from said rotor blade platform and located in alignment with said outer duct; and a stator unit mounted within said outer duct in concentric relation with said support structure and said rotor blade units; said stator unit including a support housing generally aligned with the wall of said outer duct; a plurality of compressor stator blades fixedly secured to and extending inwardly from said support housing; a stator blade platform portion secured to the extremity of each of said compressor blades and mounted in alignment with the wall of said inner duct; a plurality of turbine stator blades secured to said stator blade platform and disposed within said inner duct; said turbine-compressor rotor and stator blades being alternately disposed along the longitudinal axis of said ducting system so that the heated gas passing through said inner duct effects the simultaneous rotation of said turbine and compressor rotor blades relative to said stator blades whereby the cooled gas circulating through said outer duct is compressed to provide the necessary circulation rate to sustain the system in a free-running state; and ancillary means for starting the rotation of said support structure.

References Cited by the Examiner

UNITED STATES PATENTS

| | | | |
|---|---|---|---|
| 2,414,410 | 1/47 | Griffith | 230—122 |
| 2,428,330 | 9/47 | Heppner | 230—122 |
| 2,692,724 | 10/54 | McLeod | 230—122 |
| 3,070,530 | 12/62 | Metcalf | 60—95 |

FOREIGN PATENTS 799,212   8/58   Great Britain.

CARL D. QUARFORTH, *Primary Examiner.*

REUBEN EPSTEIN, *Examiner.*